(12) United States Patent
Allen et al.

(10) Patent No.: US 9,619,209 B1
(45) Date of Patent: Apr. 11, 2017

(54) DYNAMIC SOURCE CODE GENERATION

(71) Applicant: International Business Machines Corporation, Armonk, NY (US)

(72) Inventors: Corville O. Allen, Morrisville, NC (US); Heather L. Duschl, Raleigh, NC (US); Marit L. Imsdahl, Cary, NC (US); Alexandra D Markello, Fayetteville, NC (US); Dana L. Price, Surf City, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/010,184

(22) Filed: Jan. 29, 2016

(51) Int. Cl.
*G06F 9/44* (2006.01)
*G06F 17/27* (2006.01)

(52) U.S. Cl.
CPC .............. *G06F 8/30* (2013.01); *G06F 17/275* (2013.01); *G06F 17/2705* (2013.01)

(58) Field of Classification Search
None
See application file for complete search history.

(56) References Cited

U.S. PATENT DOCUMENTS

| | | | | |
|---|---|---|---|---|
| 6,173,441 B1 * | 1/2001 | Klein | ................... | G06F 8/41 704/9 |
| 6,915,254 B1 * | 7/2005 | Heinze | ................... | G06F 17/27 382/225 |
| 7,085,708 B2 | 8/2006 | Manson | | |
| 7,765,097 B1 * | 7/2010 | Yu | ................... | G06F 17/243 704/9 |
| 8,359,287 B2 | 1/2013 | Pucher | | |
| 9,268,770 B1 * | 2/2016 | Kursun | ................ | G06F 17/2785 |
| 2002/0107759 A1 * | 8/2002 | An | ................... | G06Q 30/02 709/206 |
| 2004/0102960 A1 * | 5/2004 | Shimomura | ........ | G06F 17/2785 704/9 |
| 2007/0106497 A1 * | 5/2007 | Ramsey | ................ | G06F 17/278 704/9 |
| 2008/0059348 A1 * | 3/2008 | Glassman | .............. | G06Q 30/02 705/35 |
| 2010/0228693 A1 * | 9/2010 | Dawson | .............. | G06F 17/2705 706/12 |

(Continued)

OTHER PUBLICATIONS

Corvitte O. Allen, et al.,"Dynamic Source Code Generation", U.S. Appl. No. 15/010,185, filed Jan. 29, 2016.

(Continued)

*Primary Examiner* — Insun Kang
(74) *Attorney, Agent, or Firm* — Cantor Colburn LLP; Richard Wilhelm

(57) ABSTRACT

Embodiments include method, systems and computer program products for dynamic source code generation. In some embodiments, data may be received. The data may include natural language and corresponding source code. Parsed natural language may be generated using the data to identify and analyze the natural language. Parsed source code may be generated using the data to identify and analyze the corresponding source code. Mappings between the parsed natural language and the parsed source code may be generated. The mappings may be transmitted.

14 Claims, 6 Drawing Sheets

(56) References Cited

U.S. PATENT DOCUMENTS

| | | | |
|---|---|---|---|
| 2012/0253793 A1* | 10/2012 | Ghannam | G06F 17/2785 704/9 |
| 2012/0272205 A1* | 10/2012 | Fox | G06F 8/36 717/101 |
| 2013/0103391 A1 | 4/2013 | Millmore et al. | |
| 2013/0124194 A1* | 5/2013 | Nadal | G06F 17/30976 704/9 |
| 2014/0143753 A1* | 5/2014 | Chappel | G06F 8/315 717/106 |
| 2014/0201702 A1* | 7/2014 | Kaplinger | G06F 8/76 717/101 |
| 2014/0280110 A1* | 9/2014 | Simitsis | G06F 17/3053 707/728 |
| 2015/0331864 A1* | 11/2015 | Lucas | G06F 17/3053 707/692 |
| 2015/0348157 A1* | 12/2015 | Garcia | G06Q 30/0643 705/26.62 |
| 2015/0363176 A1* | 12/2015 | Sheng | G06F 8/42 717/143 |
| 2016/0179787 A1* | 6/2016 | Deleeuw | G06F 17/2785 704/9 |

OTHER PUBLICATIONS

List of IBM Patents or Patent Applications Treated as Related; POU920150329US1, Date Filed: Jan. 29, 2016, pp. 1-2.

\* cited by examiner

Problem Statement in Textbook:

A bank account handles withdraw and deposit
        302              304         306              308

Source Code in Textbook:

310
BankAccount() {   314    316
    withdraw(double amount) {
312     balance = balance – amount;
                    318
    }
    deposit (double amount) {
        balance = balance + amount;
    }
}

FIG. 3A

Problem Statement in Request:
A bank account consists of a customer, an account number and a balance.
       332              334A              336A                  336B A bank account can have a withdrawal, resulting in a balance decrease.
       332              334B         338A                          336C A bank account can have a deposit, resulting in a balance increase.
       332              334B         338B Generated Source Code:
340
BankAccount() {
    String customer = "John Doe";
    int accountNumber = 9876;
    double balance = 1000.75;
       342         344          346
    withdraw(double decrease) {
        balance = balance – decrease;
                348
    }
       350        352            354
    deposit(double increase) {
        balance = balance + increase;
    }
}

FIG. 3B

DYNAMIC SOURCE CODE GENERATION

BACKGROUND

The present disclosure relates to data processing, and more specifically, to methods, systems and computer program products for dynamic source code generation.

Source code is the collection of computer instructions written using a programming language. Source code of an application may be designed to facilitate the work of computer programmers who specify actions to be performed by a computing device by writing source code. However, generating source code may be time consuming, require specific knowledge of programming languages, and an understanding of the underlying constructs of software development. Translating real-world problems into a set of executable instructions for a computing device generally requires a person with an understanding of programming languages and software concepts to develop source code to provide to the computing device. Once an application has been generated, the execution of the source code may be automated, such as by a compiler or interpreter.

SUMMARY

In accordance with an embodiment, a method for dynamic source code generation is provided. The method may include receiving data comprising natural language and corresponding source code; generating parsed natural language using the data to identify and analyze the natural language; generating parsed source code using the data to identify and analyze the corresponding source code; generating mappings between the parsed natural language and the parsed source code; and transmitting the mappings.

In another embodiment, a computer program product may comprise a non-transitory storage medium readable by a processing circuit that may store instructions for execution by the processing circuit for performing a method that may include: receiving data comprising natural language and corresponding source code; generating parsed natural language using the data to identify and analyze the natural language; generating parsed source code using the data to identify and analyze the corresponding source code; generating mappings between the parsed natural language and the parsed source code; and transmitting the mappings.

In another embodiment, a system may include a processor in communication with one or more types of memory. The processor may be configured to receive data comprising natural language and corresponding source code; generate parsed natural language using the data to identify and analyze the natural language; generate parsed source code using the data to identify and analyze the corresponding source code; generate mappings between the parsed natural language and the parsed source code; and transmit the mappings.

BRIEF DESCRIPTION OF THE DRAWINGS

The forgoing and other features, and advantages of the disclosure are apparent from the following detailed description taken in conjunction with the accompanying drawings in which:

FIG. 3A is a block diagram illustrating a sample input data for dynamic source code generation in accordance with an exemplary embodiment;

FIG. 3B is block diagram illustrating an example input of data and output of dynamically generated source code in accordance with an exemplary embodiment;

DETAILED DESCRIPTION

Figure 1:
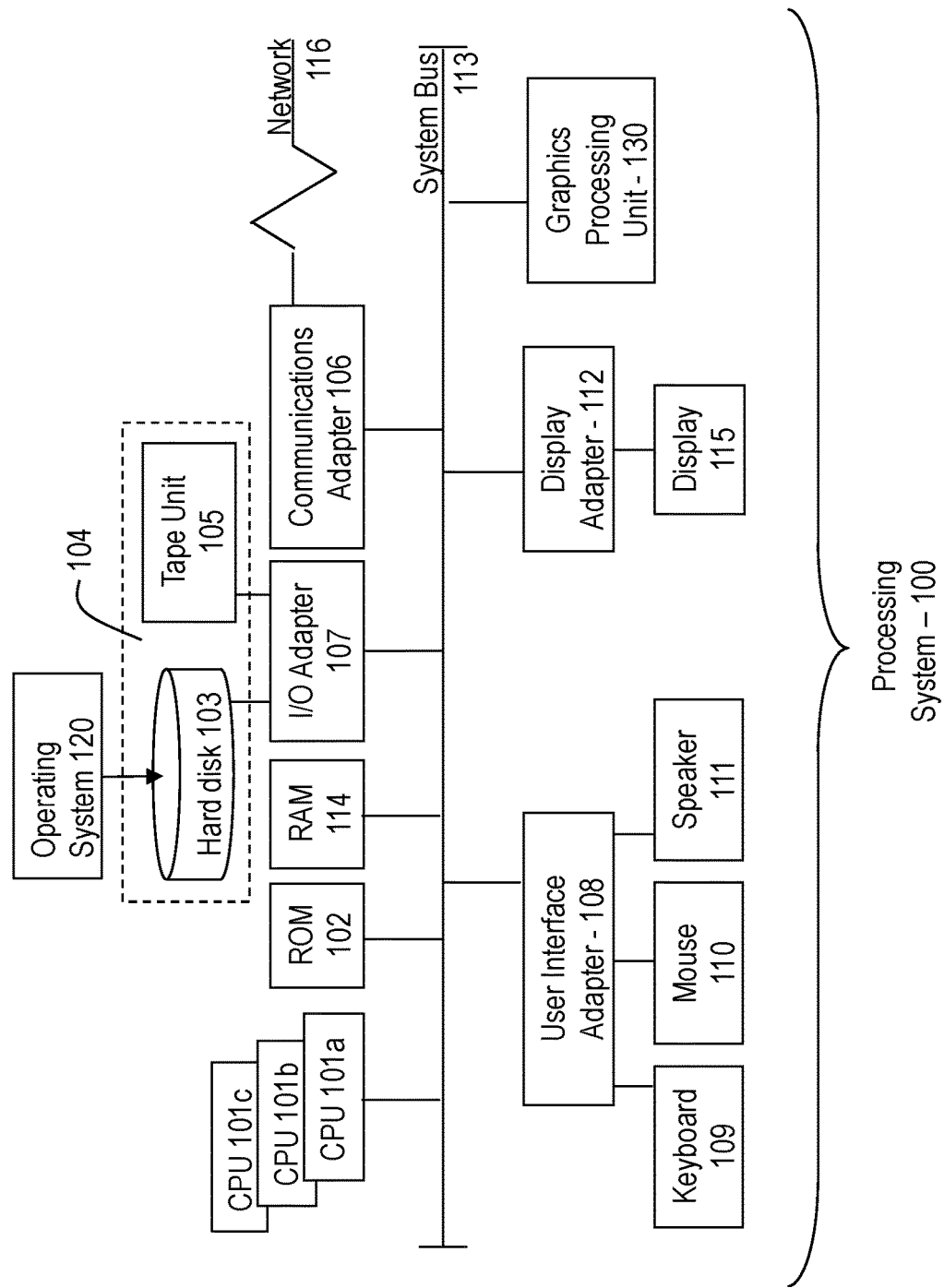
FIG. 1 is a block diagram illustrating one example of a processing system for practice of the teachings herein.

In accordance with exemplary embodiments of the disclosure, methods, systems and computer program products for dynamic source code generation are provided. The systems and methods described herein are directed to the aggregation of processed data (e.g., natural language text and corresponding source code provided in textbooks) across an entire corpus to generate a knowledge base that will be used to dynamically generate source code using consistent programming constructs used to solve problems. Mappings between natural language and corresponding source code may be correlated and weighted, utilizing the parts of speech of the natural language and source code snippets to develop a training set for machine learning techniques to be used to dynamically generate source code from provided natural language. The training set may be used to train computing devices to construct objects, methods, formula, and other programming constructs necessary to generate source code. In some embodiments, the mappings between the natural language and corresponding source code may be ranked and/or weighted based on the reputation values associated with different aspects of the processed data (e.g., textbook, textbook entries, authors of the textbooks, corporate-standard reference books, etc.) or other ranking factors. An electronic textbook may be a book in electronic form representing a standard of work that provide information and can be utilized to learn a subject. The electronic form can be in short texts in electronic data, spread out over disparate websites or in the form of courses that are pulled in from sources to designate a text book.

Dynamic source code generation may be used to increase the efficiency of software developers as less time may be spent on generating basic code and more time may be spent on evaluating and developing software to handle complex problems. Additionally, the systems and methods described herein may enhance user ramp-up and reduce time for a user to become proficient in a programming language. Dynamic source code generation may also ensure the level of quality across different projects is consistent by employing best practices in the generation of source code.

In some embodiments, a knowledgebase server may develop a mapping of how real-world objects are represented and interact with each other in various data structures based on a corpus of computer science literature by processing the literature (e.g., electronic or scanned textbooks). The knowledgebase server may compare the natural language of how the problem is framed to how it is represented in source code. The knowledgebase server may process the computer science literature. In some embodiments, the knowledgebase server may parse and analyze the natural language problems, parse and analyze the corresponding source code, and may generate a mapping of the parsed natural language and the parsed source code by correlating them and then ranking the different mappings. The mappings may be transmitted to a knowledgebase datastore.

In some embodiments, a code generation server may receive a request from a user device. The request may include a natural language problem. The code generation server may obtain training data (e.g., mappings generated by the knowledgebase server). The code generation server may parse and analyze the natural language problem provided by the user device and may generate source code using the training data obtained from the knowledgebase datastore. The generated source code may be provided to the user device in response to the received request.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
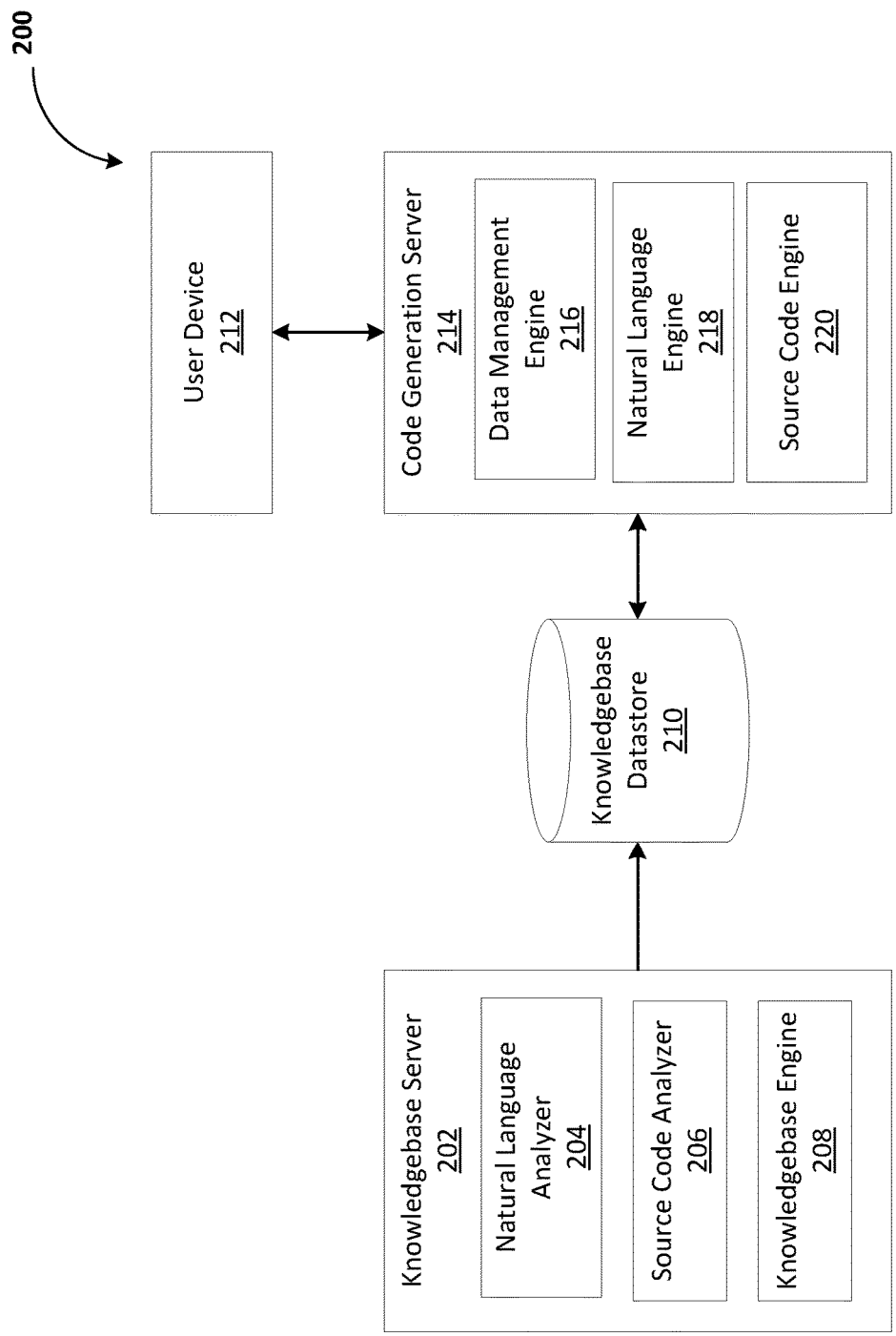
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a knowledgebase server 202, a knowledgebase datastore 210, a user device 212, and/or a code generation server 214. In some embodiments, the knowledgebase server 202 may include a natural language analyzer 204, a source code analyzer 206, and/or a knowledgebase engine 208. In some embodiments, the code generation server 214 may include a data management engine 216, a natural language engine 218, and/or a source code engine 220.

In some embodiments, the knowledgebase server 202 may be any type of computing device, such as a computer, laptop, server, etc. In some embodiments, the knowledgebase server 202 may include a natural language analyzer 204, a source code analyzer 206, and/or a knowledgebase engine 208. The natural language analyzer 204 may include computer-readable instructions that in response to execution by the processor(s) 101 cause operations to be performed including processing data received by the knowledgebase server 202 (e.g., electronic textbooks, scans of textbooks, computer science literature, etc.) to identify natural language problems. The natural language analyzer 204 may parse the natural language problem and may process the parsed natural language problem to identify different parts of speech. In some embodiments, the natural language analyzer 204 may generate metadata, such as tags, to associate with the different components of the parsed natural language problem and may store the parsed natural language and associated metadata. In some embodiments, the natural language analyzer 204 may also identify, parse, and process source code corresponding to the natural language problem to generate metadata indicating the different parts of speech of the source code. The natural language analyzer 204 may transmit the processed data to the knowledgebase engine 208.

The source code analyzer 206 may include computer-readable instructions that in response to execution by the processor(s) 101 cause operations to be performed including processing data received by the knowledgebase server 202 (e.g., electronic textbooks, scans of textbooks, computer science literature, etc.) to identify source code corresponding to natural language problems. The source code analyzer 206 may parse the source code and may process the parsed natural language problem to identify different programming constructs of the source code. In some embodiments, the source code analyzer 206 may generate metadata, such as tags, to associate with the different components of the parsed source code and may store the parsed source code and associated metadata. In some embodiments, the parsed source code and associated metadata may be transmitted to the knowledgebase engine 208.

The knowledgebase engine 208 may include computer-readable instructions that in response to execution by the processor(s) 101 cause operations to be performed including generating mappings between natural language and source code based on processed data received from the natural language analyzer 204 and the source code analyzer 206. The knowledgebase engine 208 may obtain one or more reputation values for different aspects of the data received by the knowledgebase server 202, such as for a textbook, an entry in the textbook, or an author of the textbook. In some embodiments, the knowledgebase server 202 may receive other types of ranking factors, such as date the data was published, the reputation or ranking of the publisher, the rating of the data by users, or the like. The knowledgebase server 202 may generate mappings of the natural language and source code by correlating the parsed natural language and parsed source code and ranking and/or weighting the mappings. In some embodiments, the knowledgebase engine 208 may use machine learning techniques to generate the mappings. The mappings may be transmitted to a datastore, such as a knowledgebase datastore 210.

In some embodiments, a user device 212 may be provided. The user device 212 may be any type of computing device, such as a laptop, computer, server, smartphone, tablet, or the like. The user device 212 may provide a user interface, which may be used to capture a natural language problem. For example, the sensors of the user device 212, such as a microphone, may be used to capture a natural language problem. The user device 212 may translate the captured audio to text and may generate a request that includes the natural language problem. In some embodiments, the user device 212 may provide a user interface that enables a user to provide the text of a natural language problem, either directly into a text box or through an image which would be processed to obtain the text of the natural language problem. The natural language problem may then be included in a request that may be transmitted to a code generation server 214.

A code generation server 214 may be any type of computing device, such as a laptop, server, computer, smartphone, tablet, or the like. The code generation server 214 may include a data management engine 216, a natural language engine 218, and/or a source code engine 220. The data management engine 216 may include computer-readable instructions that in response to execution by the processor(s) 101 cause operations to be performed including receiving requests from one or more user devices 212, identifying natural language problems from the requests and transmitting them to the natural language engine 218, obtaining training sets from sources, such as knowledgebase datastores 210, and/or generating responses to requests that include generated source code.

The natural language engine 218 may include computer-readable instructions that in response to execution by the processor(s) 101 cause operations to be performed including receiving natural language problems from a data management engine 216. The natural language engine 218 may parse the natural language problem and may process the parsed natural language problem to identify different parts of speech. In some embodiments, the natural language engine 218 may generate metadata, such as tags, to associate with the different components of the parsed natural language problem and may store the parsed natural language and associated metadata. The natural language engine 218 may transmit the processed data to the source code engine 220.

The source code engine 220 may include computer-readable instructions that in response to execution by the processor(s) 101 cause operations to be performed including receiving parsed natural language and metadata from the natural language engine 218, receiving, a training set from the data management engine 216, and generating source code corresponding to the natural language problem. In some embodiments, the source code engine 220 may use machine learning techniques to generate the source code and may utilize the training set retrieved from the knowledgebase datastore 210 and the parsed natural language problem. The source code engine 220 may transmit the generated source code to the data management engine 216, which may then generate and transmit a response to the request and may include the generated source code.

FIG. 3A is a block diagram illustrating a sample input data 300 for dynamic source code generation in accordance with an exemplary embodiment. A computer science textbook may provide an example of how to create a bank account object. The natural language analyzer 204 may identify and parse the sentence and use semantic and linguistic analysis based on its learning from external corpora of natural language to understand the vocabulary used. In this case, the natural language analyzer 204 may recognize the verb "handles" and recognize that the verb precedes words that will become methods (e.g., "withdraw" and "deposit"). In other words, the problem statement in the textbook excerpt depicted may be analyzed by the natural language analyzer 204. The natural language analyzer 204 may identify the term "bank account" as a subject 302, "handles" as a verb 304, "withdraw" as an object 306, and "deposit" as a second object 308. The source code analyzer 206 may analyze the source code in the textbook and recognize that "BankAccount" is a class 310, "withdraw" is the name of a method 312, "double" indicates the type of variable 314, "amount" indicates the name of the variable 316, and "balance=balance−amount" as a formula 318. The knowledgebase engine 208 may generate a mapping of the terms identified by the natural language analyzer 204 and the source code analyzer 206.

FIG. 3B is block diagram illustrating an example input of data and output of dynamically generated source code 330 in accordance with an exemplary embodiment. A request may include a natural language problem statement. The natural language engine 218 of the code generation server 214 may parse and analyze the natural language problem and determine that the term "bank account" is a subject 332, the term "consists" is a verb 334A, the term "have" is another verb 334B, the term "customer" is an object 336A, "account number" is a second object 336B, and the term "balance" is another object "336C". Based on the training set obtained from the knowledgebase datastore 210, the source code engine 220 may determine that the subject should become the name of the class 340, that the balance 336C should become a variable 344 of type double 342 and may set the value 346 of the variable to 1000.75 based on data received from the request. The source code engine 220 may determine that the phrase following an object should be interpreted into a formula. For example, the term "withdrawal" is an object 338A which may be used to generate a method with a formula 348 of "balance=balance−decrease" based on the phrase that followed the term in the natural language statement. Similarly, the source code engine 220 may determine that the phrase following the object "deposit" 338B should be the name of the method 350 that take an input variable 354 (e.g., increase) that is of type double 352 and has a formula of "balance=balance+increase" based on the phrase following the object 338B in the problem statement.

Figure 4:
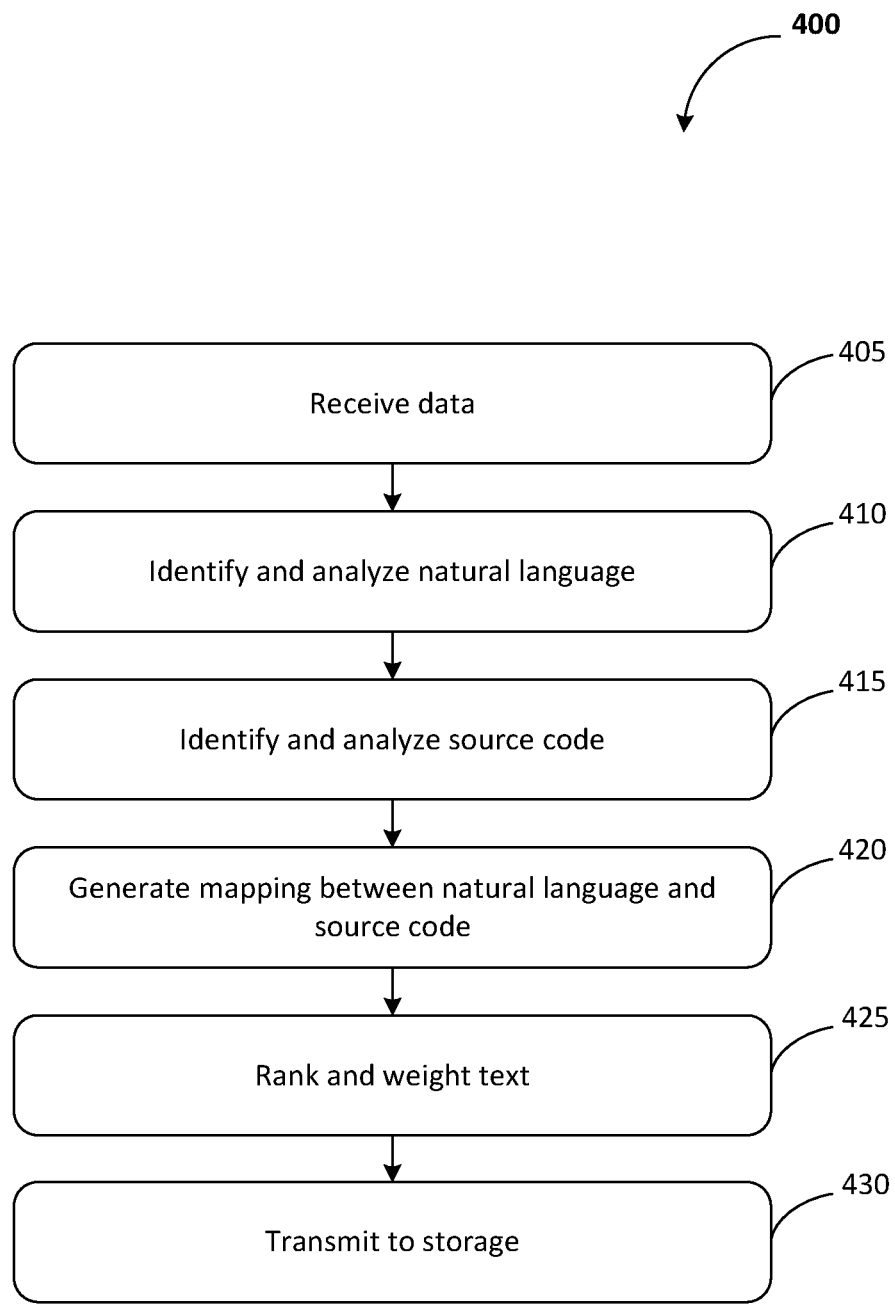
FIG. 4 is a flow diagram of a method for generating a knowledgebase for dynamic source code generation in accordance with an exemplary embodiment.

Now referring to FIG. 4, a flow diagram of a method 400 for generating a knowledgebase for dynamic source code generation in accordance with an exemplary embodiment is provided.

At block 405, data may be received. In some embodiments, the knowledgebase server 202 may receive data. In some embodiments, the data may be computer science literature that includes natural language problems and corresponding source code examples. Examples of data may include textbooks (e.g., such as electronic textbooks), teaching manuals, presentations, or the like. In some embodiments, the data may need to be processed. For example, if the data is received as images, then the data must be processed to extract the text, such as through optical character recognition (OCR).

At block 410, natural language may be identified and analyzed. The natural language analyzer 204 may identify and analyze natural language problems from the data. For example, the natural language analyzer 204 may identify a natural language problem in the text of the data and may generate parsed natural language by parsing the natural language problem. The natural language analyzer 204 may generate metadata associated with the parsed natural language. Examples of types of metadata that may be generated include tags that identify the type of speech (e.g., nouns, verbs, subject, object, etc.) of the parsed natural language. The parsed natural language and associated metadata may then be transmitted to a knowledgebase engine 208. In some embodiments, the natural language analyzer 204 may also parse and analyze the corresponding source code and generate associated metadata that identifies the parsed source code into different types of speech.

At block 415, source code may be identified and analyzed. In some embodiments, the source code analyzer 206 may identify and analyze the source code corresponding to the natural language problem. The source code analyzer 206 may identify the example source code in the text of the data and may generate parsed source code by parsing the example source code in the data. The source code analyzer may parse and analyze the source code and generate metadata to identify the different types of software constructs (e.g., class, method, variables, variable types, etc.) associated with the parsed source code. The parsed source code and associated metadata may then be transmitted to the knowledgebase engine 208.

At block 420, a mapping may be generated between the natural language and source code. In some embodiments, the knowledgebase engine 208 may receive parsed natural language and associated metadata from the natural language analyzer 204 and may receive parsed source code and associated metadata from the source code analyzer 206. In some embodiments, the knowledgebase engine 208 may receive parsed source code and associated metadata from the natural language analyzer 204. The knowledgebase engine 208 may generate mappings between the parsed natural language and the parsed source code. In some embodiments, the knowledgebase engine 208 may use the data received from the natural language analyzer 204 and/or the source code analyzer 206 to generate the mappings. In some embodiments, the knowledgebase engine 208 may correlate the parsed natural language and the parsed source code based on parts of speech of the natural language and snippets of the corresponding source code (e.g., using the metadata associated with the parsed natural language or parsed source code). In some embodiments, the knowledgebase engine 208 may use machine learning techniques to generate a training set for use by the code generation server 214 to dynamically generate source code.

At block 425, the text may be ranked and weighted. In some embodiments, the knowledgebase engine 208 may rank and/or weight the mappings using ranking factors. For example, the knowledgebase engine 208 may rank the mappings using a reputation value. A reputation value may be associated with a textbook, a textbook entry, or an author associated with the electronic textbook. In some embodiments, the mappings may be ranked and/or weighted by other ranking factors, such as a date the data was published, the reputation or ranking of the publisher, the rating of the data by users, or the like.

At block 430, the mapping may be transmitted to storage. In some embodiments, the knowledgebase engine may transmit the training set and/or mappings to a knowledgebase datastore 210.

Figure 5:
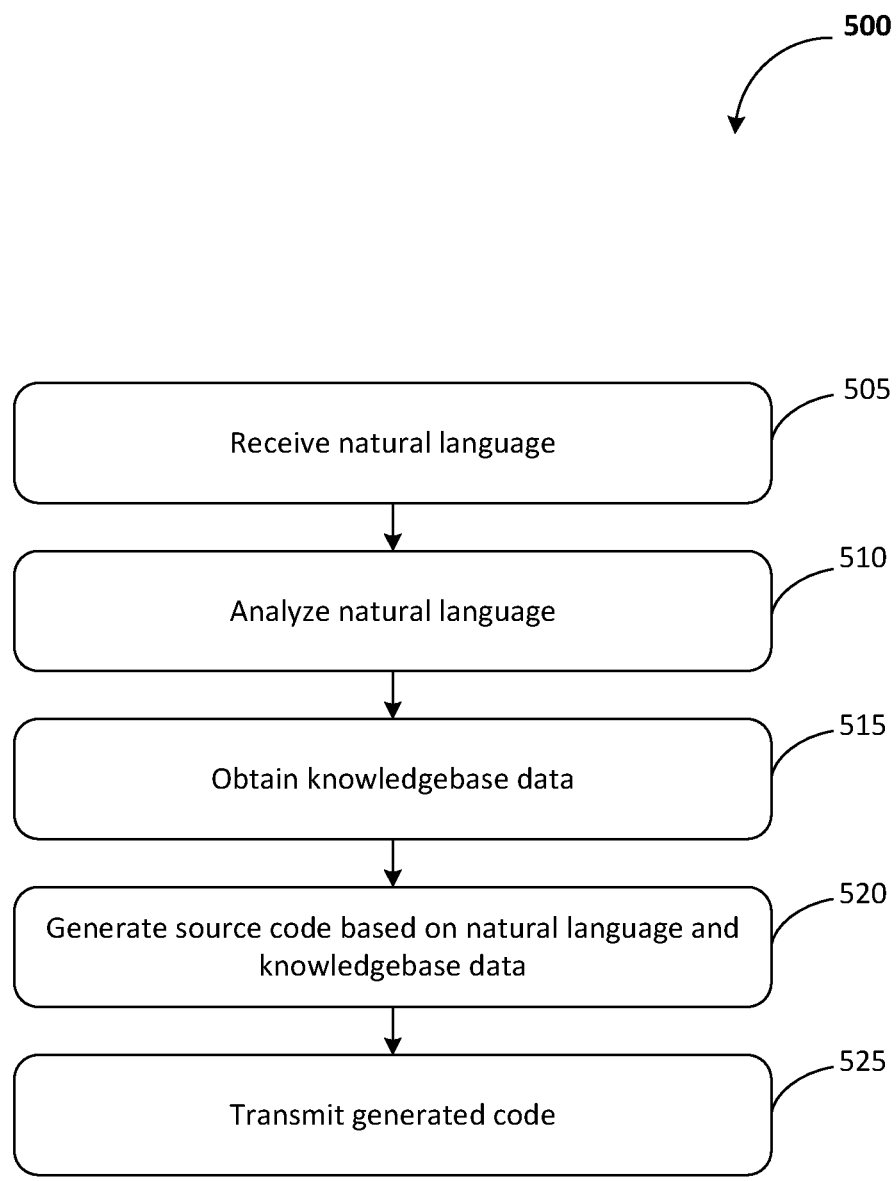
FIG. 5 is a flow diagram of a method for dynamic source code generation in accordance with an exemplary embodiment.

Now referring to FIG. 5, a flow diagram of a method 500 for dynamic source code generation in accordance with an exemplary embodiment. At block 505, natural language may be received. In some embodiments, a code generation server 214 may receive a request from a user device 212. The request may include data. In some embodiments, the data may include a natural language problem statement. In some embodiments, the data may also include other information, such as an indication of a programming language the source code should be created with. In some embodiments, the data may need to be processed to obtain the natural language problem statement. For example, the data may be an audio file that needs to be converted into text or may be an image that needs to have text extracted. The data management engine 216 may receive the request and may process the request to obtain data from the request. The data management engine 216 may also facilitate processing the data into text and transmit the text to the natural language engine 218.

At block 510, the natural language may be analyzed. In some embodiments, the natural language engine 218 may receive the data from the data management engine 216. The natural language engine 218 may generate parsed natural language using the data. In some embodiments, the natural language engine 218 may obtain a language training set that may be utilize in conjunction with machine learning techniques to analyze the parsed natural language and generate metadata associated with the parsed natural language to identify characteristics of the parsed natural language (e.g., speech type). The parsed natural language and associated metadata may be transmitted to the source code engine 220.

At block 515, knowledgebase data may be obtained. In some embodiments, the data management engine 216 may obtain the knowledgebase data from a datastore, such as a knowledgebase datastore 210. The data management engine 216 may obtain the knowledgebase data based on the request. For example, the data management engine 216 may obtain knowledgebase data using the indication received in the request for a specific programming language. The knowledgebase data may be transmitted to the source code engine 220 by the data management engine 216.

At block 520, source code may be generated based on the natural language and knowledgebase data. In some embodiments, the source code engine 220 may generate source code based on the parsed natural language and the knowledgebase data. Generating the source code may include applying machine learning to the parsed natural language using the knowledgebase data. In some embodiments, the source code engine 220 may use the metadata associated with the parsed natural language and the knowledgebase data to generate the source code.

At block 525, transmit the generated code. The data management engine 216 may receive the generated source code from the source code engine 220. In some embodiments, the data management engine 216 may transmit the source code to a datastore and may generate a notification to the user device 212 indicating the location of the source code. In some embodiments, the data management engine 216 may transmit the source code in the request to the user device 212.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving data, from a user device by a code generation server, wherein the received data comprises text of a natural language problem, and corresponding source code;

generating, by a natural language engine, parsed natural language using the data by identifying and parsing the natural language problem to generate metadata tags that identify types of speech of the parsed natural language;

generating, by a source code engine, parsed source code using the data by parsing and analyzing the corresponding source code to generate first metadata to identify different types of software constructs associated with the parsed source code;

generating, by the natural language engine, second metadata that identifies the parsed source code into the types of speech of the parsed natural language by analyzing the corresponding source code;

generating, by a data management engine, mappings between the parsed natural language and the parsed source code based on the metadata tags and the first and second metadata;

ranking, by the data management engine, the mappings based on a reputation value associated with at least one of an electronic textbook, an electronic textbook entry, or an author associated with the electronic textbook; and transmitting, by the data management engine, the mappings between the parsed natural language and the parsed source code to a datastore, wherein the reputation value indicates a rating by users of the at least one of the electronic textbook, the electronic textbook entry, or the author associated with the electronic textbook.

2. The computer-implemented method of claim 1, wherein the data comprises the electronic textbook, a scanned textbook, or audio input.

3. The computer-implemented method of claim 1, wherein generating the mappings further comprises:
   correlating the parsed natural language and the parsed source code based on parts of speech of the natural language and snippets of the corresponding source code.

4. The computer-implemented method of claim 1, wherein the datastore comprises a knowledgebase datastore.

5. The computer-implemented method of claim 1, further comprising:
   processing the natural language and the corresponding source code by a natural language analyzer.

6. A computer program product comprising a non-transitory storage medium readable by a processor of a code generation server and storing computer executable instructions for execution by the processor for performing a method comprising:
   the code generation server receiving data, from a user device, wherein the received data comprising natural language and corresponding source code;
   a natural language engine of the code generation server generating parsed natural language using the data by identifying and parsing the natural language problem to generate metadata tags that identify types of speech of the parsed natural language;
   a source code engine of the code generation server generating parsed source code using the data by parsing and analyzing the corresponding source code to generate first metadata to identify different types of software constructs associated with the parsed source code;
   the natural language engine generating second metadata that identifies the parsed source code into the types of speech of the parsed natural language by analyzing the corresponding source code;
   a data management engine of the code generation server generating mappings between the parsed natural language and the parsed source code based on the metadata tags and the first and second metadata;
   the data management engine of the code generation server ranking the mappings based on a reputation value associated with at least one of an electronic textbook, an electronic textbook entry, or an author associated with the electronic textbook; and
   the data management engine of the code generation server transmitting the mappings between the parsed natural language and the parsed source code to a datastore,
   wherein the reputation value indicates a rating by users of the at least one of the electronic textbook, the electronic textbook entry, or the author associated with the electronic textbook.

7. The computer program product of claim 6, wherein the data comprises the electronic textbook, a scanned textbook, or audio input.

8. The computer program product of claim 6, wherein generating the mappings further comprises:
   correlating the parsed natural language and the parsed source code based on parts of speech of the natural language and snippets of the corresponding source code.

9. The computer program product of claim 6, wherein the datastore comprises a knowledgebase datastore.

10. The computer program product of claim 6, wherein the method further comprises:
    processing the natural language and the corresponding source code by a natural language analyzer.

11. A system, comprising:
    a knowledgebase server having at least a natural language analyzer, a source code analyzer, and a knowledgebase engine;
    a knowledgebase datastore;
    one or more user devices; and
    a code generation server having at least a data management engine, a natural language engine, and source code engine, wherein the code generation server comprises at least a processor in communication with one or more types of memory, and one of the one or more types of memory comprises computer executable instructions, when executed at the processor, the computer executable instructions perform a method of dynamic source code generation, comprising:
    the code generation server receiving data, from a user device, wherein the received data comprises text of a natural language problem, and corresponding source code;
    the natural language engine generating parsed natural language using the data by identifying and parsing the natural language problem to generate metadata tags that identify types of speech of the parsed natural language;
    the source code engine generating parsed source code using the data by parsing and analyzing the corresponding source code to generate metadata tags that identify types of speech of the parsed natural language;
    the data management engine generating mappings between the parsed natural language and the parsed source code to generate first metadata to identify different types of software constructs associated with the parsed source code;
    the natural language engine generating second metadata that identifies the parsed source code into the types of speech of the parsed natural language by analyzing the corresponding source code;

the data management engine of the code generation server ranking the mappings based on a reputation value associated with at least one of an electronic textbook, an electronic textbook entry, or an author associated with the electronic textbook based on the metadata tags and the first and second metadata; and the data management engine transmitting the mappings between the parsed natural language and the parsed source code to a datastore, wherein the reputation value indicates a rating by users of the at least one of the electronic textbook, the electronic textbook entry, or the author associated with the electronic textbook.

12. The system of claim 11, wherein the data comprises the electronic textbook, a scanned textbook, or audio input.

13. The system of claim 11, wherein the data management engine generating mappings comprises:

correlating the parsed natural language and the parsed source code based on parts of speech of the natural language and snippets of the corresponding source code.

14. The system of claim 11, wherein the datastore comprises the knowledgebase datastore.

\* \* \* \* \*